(12) United States Patent
Ohmori

(10) Patent No.: US 11,646,435 B2
(45) Date of Patent: May 9, 2023

(54) FUEL CELL SEPARATOR MEMBER, FUEL CELL STACK, AND METHOD OF PRODUCING FUEL CELL SEPARATOR MEMBER

(71) Applicant: HONDA MOTOR CO., LTD., Tokyo (JP)

(72) Inventor: Suguru Ohmori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 201 days.

(21) Appl. No.: 17/145,627

(22) Filed: Jan. 11, 2021

(65) Prior Publication Data
US 2021/0218047 A1 Jul. 15, 2021

(30) Foreign Application Priority Data

Jan. 14, 2020 (JP) .............................. JP2020-003633

(51) Int. Cl.
| | |
|---|---|
| *H01M 8/2475* | (2016.01) |
| *H01M 8/0247* | (2016.01) |
| *H01M 8/248* | (2016.01) |
| *H01M 8/1004* | (2016.01) |
| *H01M 8/0206* | (2016.01) |
| *H01M 8/10* | (2016.01) |

(52) U.S. Cl.
CPC ....... *H01M 8/2475* (2013.01); *H01M 8/0206* (2013.01); *H01M 8/0247* (2013.01); *H01M 8/1004* (2013.01); *H01M 8/248* (2013.01); *H01M 2008/1095* (2013.01); *H01M 2250/20* (2013.01)

(58) Field of Classification Search
None
See application file for complete search history.

(56) References Cited

U.S. PATENT DOCUMENTS

2016/0072145 A1* 3/2016 Martinchek ........... H01M 8/247
429/535
2018/0366761 A1 12/2018 Ohmori et al.

FOREIGN PATENT DOCUMENTS

JP 2019-003830 A 1/2019

* cited by examiner

*Primary Examiner* — Helen Oi K Conley
(74) *Attorney, Agent, or Firm* — Carrier Shende & Associates, P.C.; Joseph P. Carrier; Jeffrey T. Gedeon

(57) ABSTRACT

A load receiver member of a fuel cell separator member of a fuel cell stack includes an attachment portion disposed between an outer peripheral portion of a first metal separator and an outer peripheral portion of a second metal separator, and a tab continuous with the attachment portion and protruding from an outer peripheral portion of a joint separator. The attachment portion is joined to the outer peripheral portion of the joint separator by a joint portion.

16 Claims, 12 Drawing Sheets

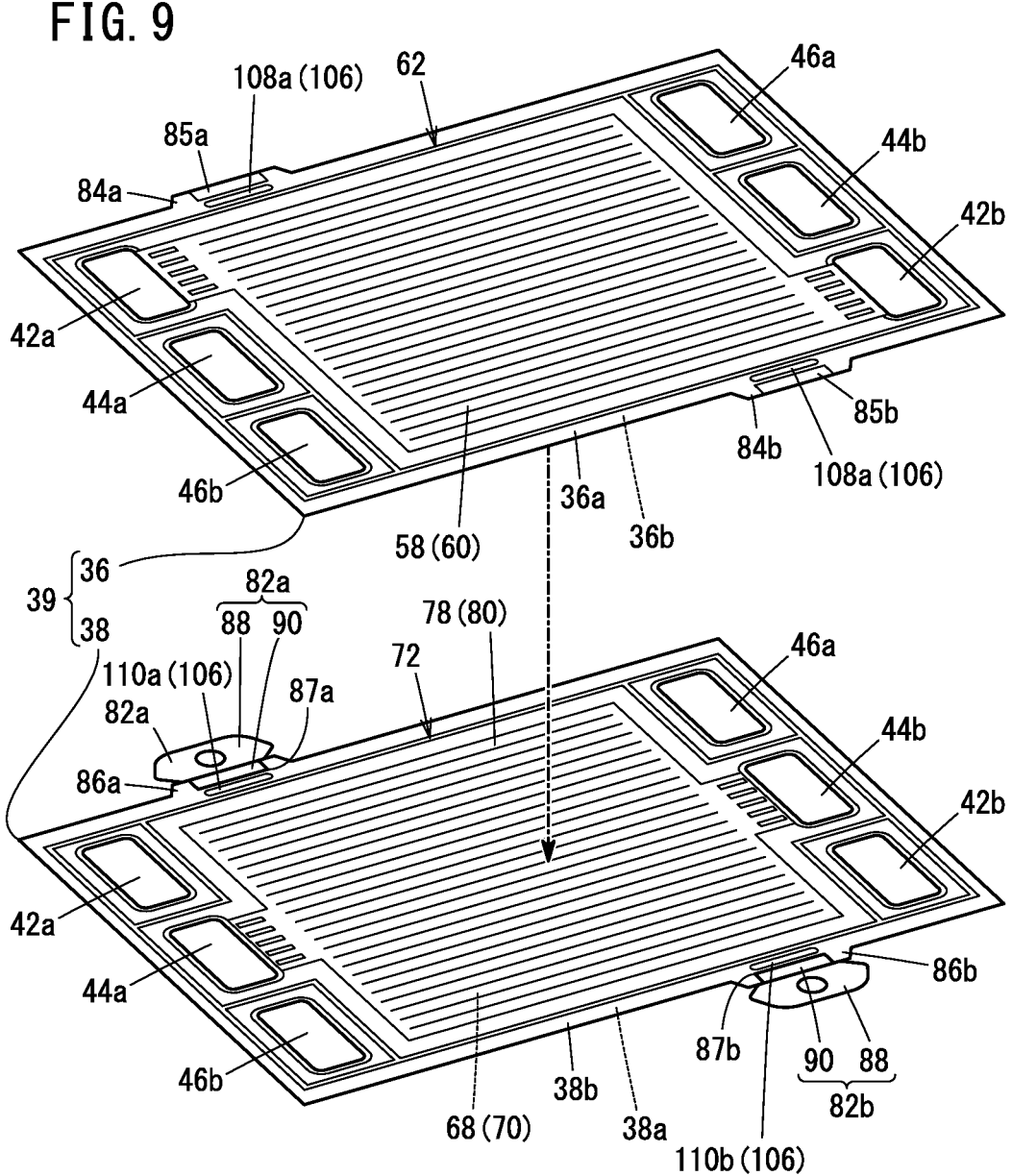

FUEL CELL SEPARATOR MEMBER, FUEL CELL STACK, AND METHOD OF PRODUCING FUEL CELL SEPARATOR MEMBER

CROSS-REFERENCE TO RELATED APPLICATION

This application is based upon and claims the benefit of priority from Japanese Patent Application No. 2020-003633 filed on Jan. 14, 2020, the contents of which are incorporated herein by reference.

BACKGROUND OF THE INVENTION

Field of the Invention

The present invention relates to a fuel cell separator member, a fuel cell stack, and a method of producing the fuel cell separator member.

Description of the Related Art

For example, a fuel cell stack of Japanese Laid-Open Patent Publication No. 2019-003830 includes a stack body formed by stacking MEAs (membrane electrode assemblies) and joint separators together alternately. The MEA is formed by providing electrodes on both sides of an electrolyte membrane. In the state where a first separator and a second separator are stacked together, the first separator and the second separator are joined together to form the joint separator. A tightening load (compression load) is applied in a stacking direction of the MEAs and the joint separators.

A load receiver member is provided on the joint separator. The load receiver includes an attachment portion fixed to an outer peripheral portion of the joint separator, and a tab provided continuous with the attachment portion and protruding from the outer peripheral portion of the joint separator. The attachment portion is joined to a surface of the outer peripheral portion of the first separator opposite to the second separator.

In the load receiver member, when an external load in a direction perpendicular to a protruding direction of the tab in which the tab protrudes and to the separator thickness direction is applied to the fuel cell stack, the tab contacts a support member provided on an end plate, a stack case, etc. Therefore, the load receiver member receives the external load applied to the fuel cell stack. Thus, the positional displacement of the joint separator is suppressed.

SUMMARY OF THE INVENTION

In the conventional technique, the attachment portion of the load receiver member is joined to the surface of the outer peripheral portion of the first separator opposite to the second separator. That is, the load receiver member is supported by one of two surfaces of the joint separator. Therefore, in the case where a force in the separator thickness direction is applied to the load receiver, the load receiver tends to be tilted with respect to the joint separator.

The present invention has been made taking the above problem, and an object of the present invention is to provide a fuel cell separator member, a fuel cell stack, and a method of producing the fuel cell separator member in which, with simple structure, improvement in the joining strength of joining a load receiver and a joint separator is achieved, and the load receiver member is not tilted easily with respect to the joint separator.

According to a first aspect of the present invention, provided is a fuel cell separator member including a joint separator formed by joining a first separator and a second separator together in a state where the first separator and the second separator are stacked together, and a load receiver member protruding from an outer peripheral portion of the joint separator, toward an outside of the joint separator, the load receiver member being fixed to the outer peripheral portion of the joint separator, wherein the load receiver member includes an attachment portion disposed between an outer peripheral portion of the first separator and an outer peripheral portion of the second separator, and a tab continuous with the attachment portion and protruding from the outer peripheral portion of the joint separator, and the attachment portion is joined to the outer peripheral portion of the joint separator by a joint portion.

According to a second aspect of the present invention, provided is a fuel cell stack including a stack body formed by stacking membrane electrode assemblies and fuel cell separator members together alternately, the membrane electrode assemblies each including electrodes provided on both sides of an electrolyte membrane. The fuel cell separator member is the fuel cell separator member as described above.

According to a third aspect of the present invention, provided is a method of producing a fuel cell separator member, the fuel cell separator member including a joint separator formed by joining a first separator and a second separator together in a state where the first separator and the second separator are stacked together, and a load receiver member protruding from an outer peripheral portion of the joint separator, toward an outside of the joint separator, the load receiver member being fixed to the outer peripheral portion of the joint separator, and including an attachment portion and a tab continuous with the attachment portion, the method including the steps of disposing the attachment portion between an outer peripheral portion of the first separator and an outer peripheral portion of the second separator in a manner that the tab protrudes toward an outside of the joint separator, and joining the outer peripheral portion of the joint separator and the attachment portion together after the disposing step.

In the present invention, in the state where the attachment portion of the load receiver member is disposed between the outer peripheral portion of the first separator and the outer peripheral portion of the second separator, the attachment portion of the load receiver member is joined to the joint separator by the joint portion. In the structure, the attachment portion is supported by the first separator and the second separator from both sides. Therefore, the load receiver member is not tilted and deformed easily in the separator thickness direction with respect to the joint separator. Further, with the simple structure, it is possible to achieve improvement in the joining strength of joining the load receiver member and the joint separator together.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a perspective view showing a disposing step;

DESCRIPTION OF THE PREFERRED EMBODIMENTS

Hereinafter, a preferred embodiment of fuel cell separator member, a fuel cell stack, and a method of producing the fuel cell separator member will be described with reference to the accompanying drawings.

Figure 1:
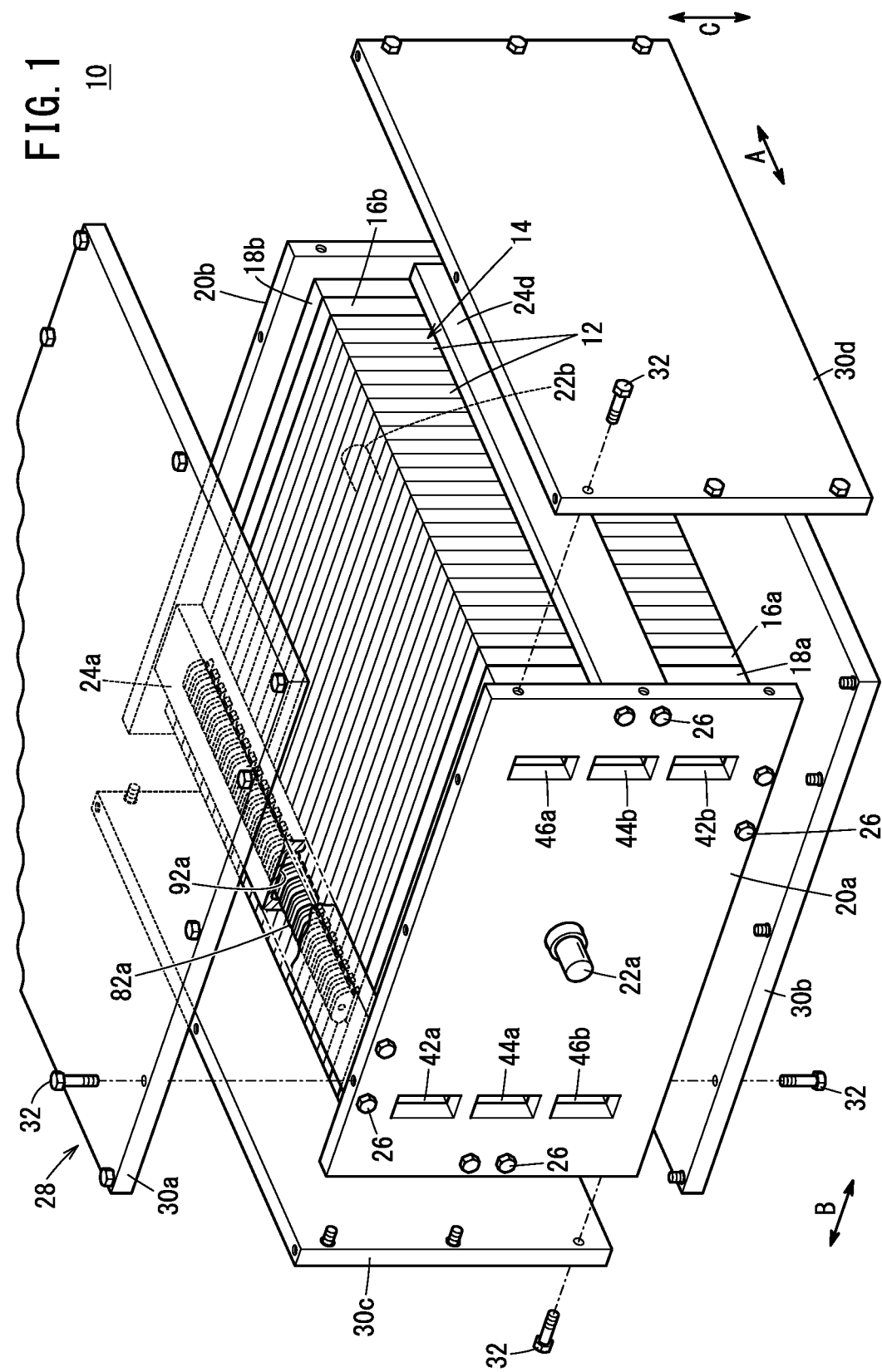
FIG. 1 is a partial exploded perspective view showing a fuel cell stack according to an embodiment of the present invention.

As shown in FIG. 1, a fuel cell stack 10 according to an embodiment of the present invention includes a stack body 14 formed by stacking a plurality of power generation cells 12 together. For example, the fuel cell stack 10 is mounted in a fuel cell automobile in a manner that a stacking direction in which a plurality of power generation cells 12 are stacked together (indicated by an arrow A) is oriented in a horizontal direction (vehicle width direction or vehicle length direction) of the fuel cell automobile. Alternatively, the fuel cell stack 10 may be mounted in the fuel cell automobile in a manner that the stacking direction in which the plurality of power generation cells 12 are stacked together is oriented in a vertical direction (vehicle height direction) of the fuel cell automobile.

At one end of the stack body 14 in the stacking direction, a terminal plate 16a is provided. An insulator 18a is provided outside the terminal plate 16a, and an end plate 20a is provided outside the insulator 18a. At the other end of the stack body 14 in the stacking direction, a terminal plate 16b is provided. An insulator 18b is provided outside the terminal plate 16b, and an end plate 20b is provided outside the insulator 18b.

An output terminal 22a is connected electrically to the terminal plate 16a. An output terminal 22b is connected electrically to the terminal plate 16b. Each of the insulators 18a, 18b is an electrically insulating plate.

Figure 2:
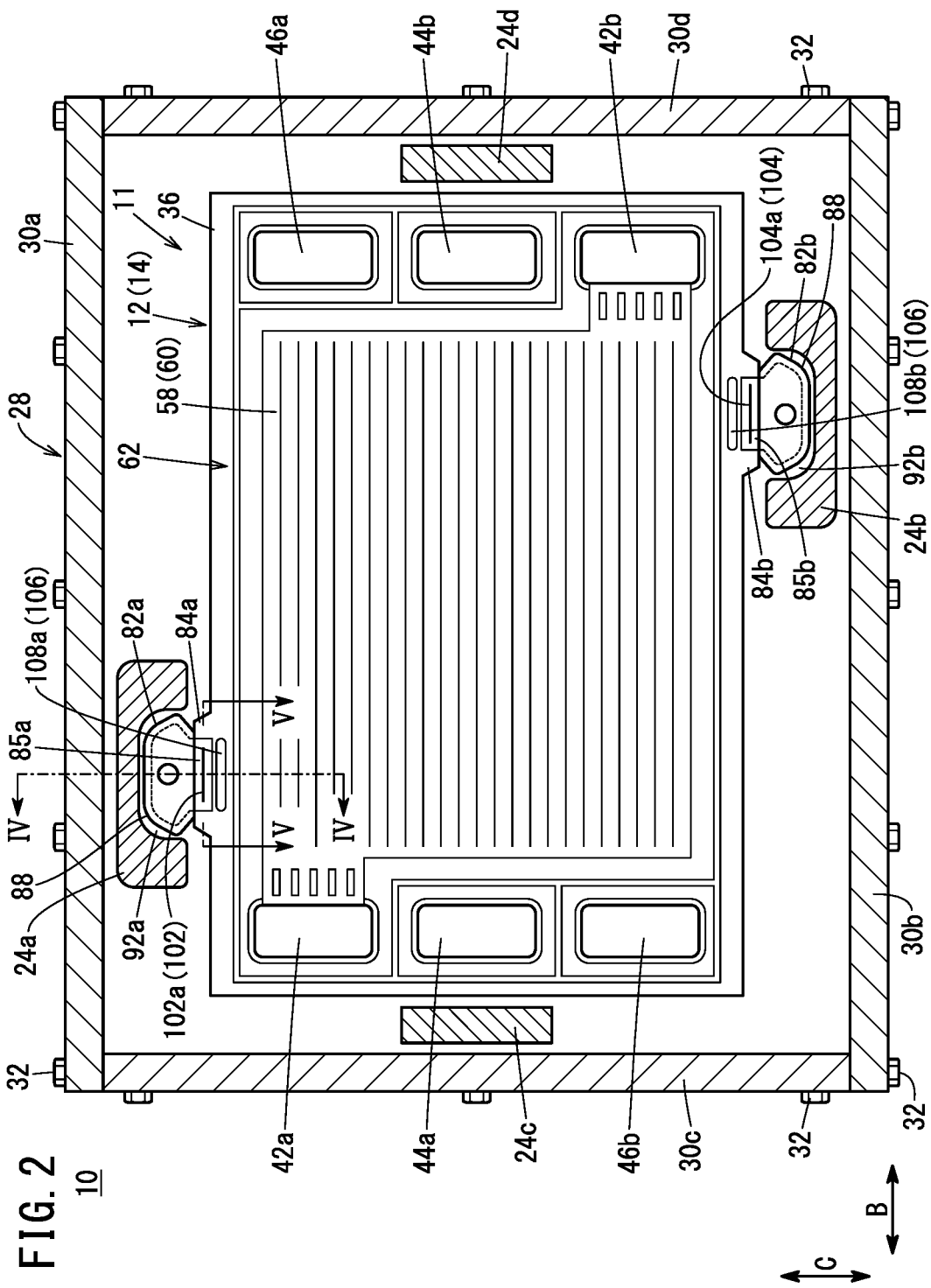
FIG. 2 is a cross sectional view schematically showing a fuel cell stack in FIG. 1.

Each of the end plates 20a, 20b has a laterally elongated rectangular shape. As shown in FIGS. 1 and 2, coupling members 24a to 24d (coupling bars) are disposed between the sides of the end plates 20a, 20b. Both ends of the coupling members 24a to 24d are fixed to inner surfaces of the end plates 20a, 20b using bolts 26 (see FIG. 1). However, a tightening load (compression load) is applied to the coupling members 24a to 24d to the fuel cell stack 10 (stack body 14) in the stacking direction (indicated by the arrow A).

The position of the coupling member 24a is shifted from the center of the long side of one of the end plates 20a, 20b. The position of the coupling member 24b is shifted from the center of the long side of the other side of the end plate 20a, 20b toward the other side. The coupling members 24c, 24d are positioned at the centers of the short sides of the end plates 20a, 20b.

The fuel cell stack 10 includes a cover 28 which covers the stack body 14 from directions (indicated by the arrows B and C) perpendicular to the stacking direction. The cover 28 includes a pair of side panels 30a, 30b having a laterally elongated plate shape and forming two surfaces at both ends of the end plates 20a, 20b in a lateral direction (indicated by an arrow C), and a pair of side panels 30c, 30d having a laterally elongated plate shape and forming two surfaces at both ends of the end plates 20a, 20b in a longitudinal direction (indicated by an arrow B).

Each of the side panels 30a to 30d is fixed to side surfaces of the end plates 20a, 20b using bolts 32. It is adequate that the cover 28 is used as necessary. The cover 28 may be dispensed with. The cover 28 may have a cylindrical shape, produced by forming the side panels 30a to 30d integrally into one piece by casting or extrusion.

Figure 3:
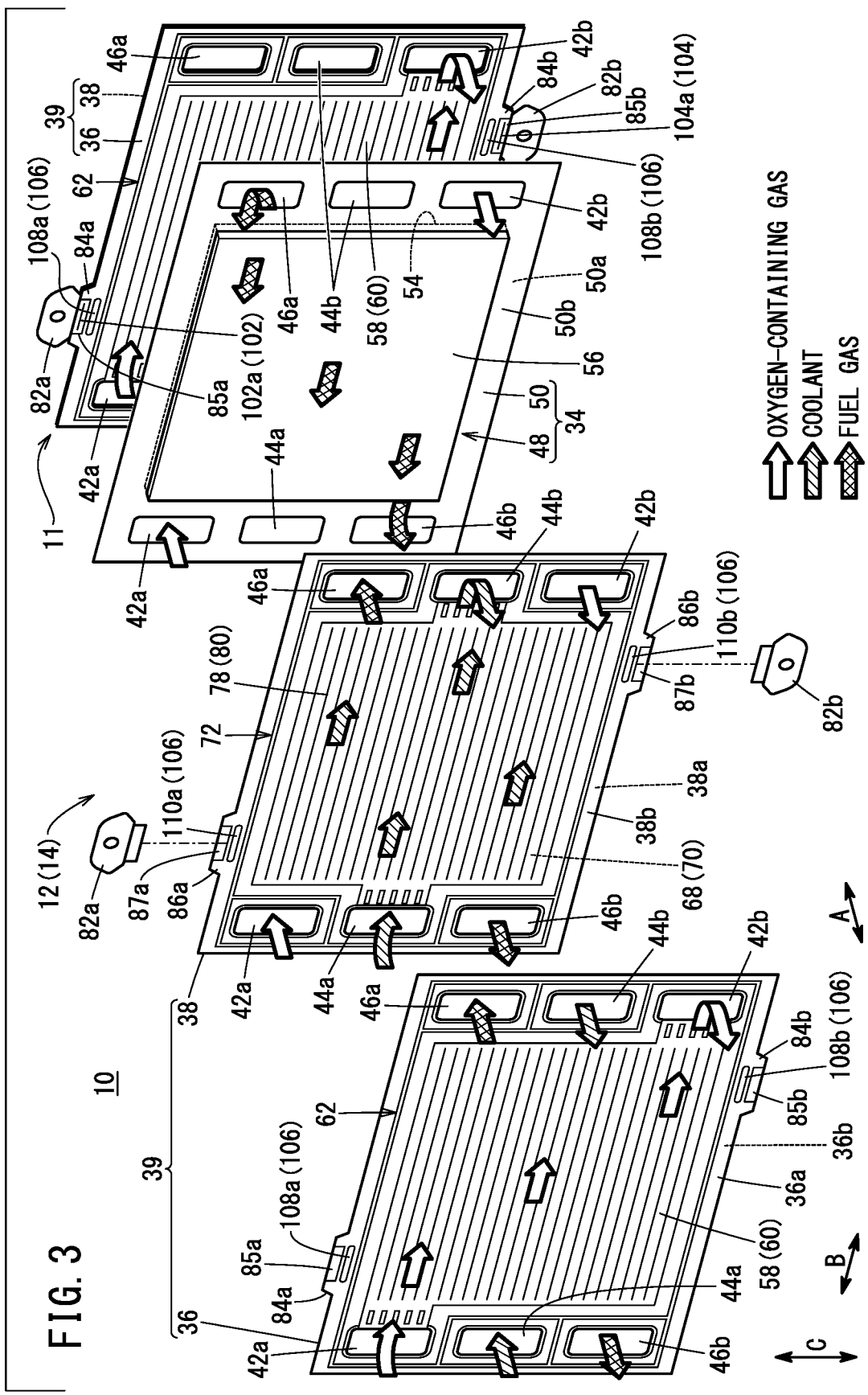
FIG. 3 is an exploded perspective view showing main components of a stack body of a fuel cell stack in FIG. 1.

As shown in FIG. 3, the power generation cell 12 includes a resin frame equipped MEA 34, and a first metal separator 36 (first separator) and a second metal separator 38 (second separator) sandwiching the resin frame equipped MEA 34 in the direction indicated by the arrow A.

At one end of the power generation cells 12 in the long side direction indicated by the arrow B, an oxygen-containing gas supply passage 42a, a coolant supply passage 44a, and a fuel gas discharge passage 46b are arranged in the direction indicated by the arrow C. The oxygen-containing gas supply passage 42a of each of the power generation cells 12 extends through the plurality of power generation cells 12 in the stacking direction (indicated by the arrow A) for supplying the oxygen-containing gas. The coolant supply passage 44a extends through each of the power generation cells 12 in the direction indicated by the arrow A for supplying a coolant (such as pure water ethylene glycol, oil). The fuel gas discharge passage 46b extends through each of the power generation cells 12 in the direction indicated by the arrow A for discharging a fuel gas (e.g., a hydrogen containing gas).

At the other end of the power generation cells 12 in the direction indicated by the arrow B, a fuel gas supply passage 46a, a coolant discharge passage 44b, and an oxygen-containing gas discharge passage 42b are arranged in the direction indicated by the arrow C. The fuel gas supply passage 46a extends through each of the power generation cells 12 in the direction indicated by the arrow A, for supplying a fuel gas. The coolant discharge passage 44b extends through each of the power generation cells 12 in the direction indicated by the arrow A, for discharging the coolant. The oxygen-containing gas discharge passage 42b extends through each of the power generation cells 12 in the direction indicated by the arrow A, for discharging the oxygen-containing gas.

It should be noted that the oxygen-containing gas supply passage 42a, the oxygen-containing gas discharge passage 42b, the fuel gas supply passage 46a, the fuel gas discharge passage 46b, the coolant supply passage 44a, and the coolant discharge passage 44b are formed also in the end plate 20a (see FIG. 1).

The sizes, positions, shapes, and the numbers of the oxygen-containing gas supply passage 42a, the oxygen-containing gas discharge passage 42b, the fuel gas supply passage 46a, the fuel gas discharge passage 46b, the coolant supply passage 44a, and the coolant discharge passage 44b are not limited to the embodiment, and may be determined as necessary depending on the required specification.

Figure 4:
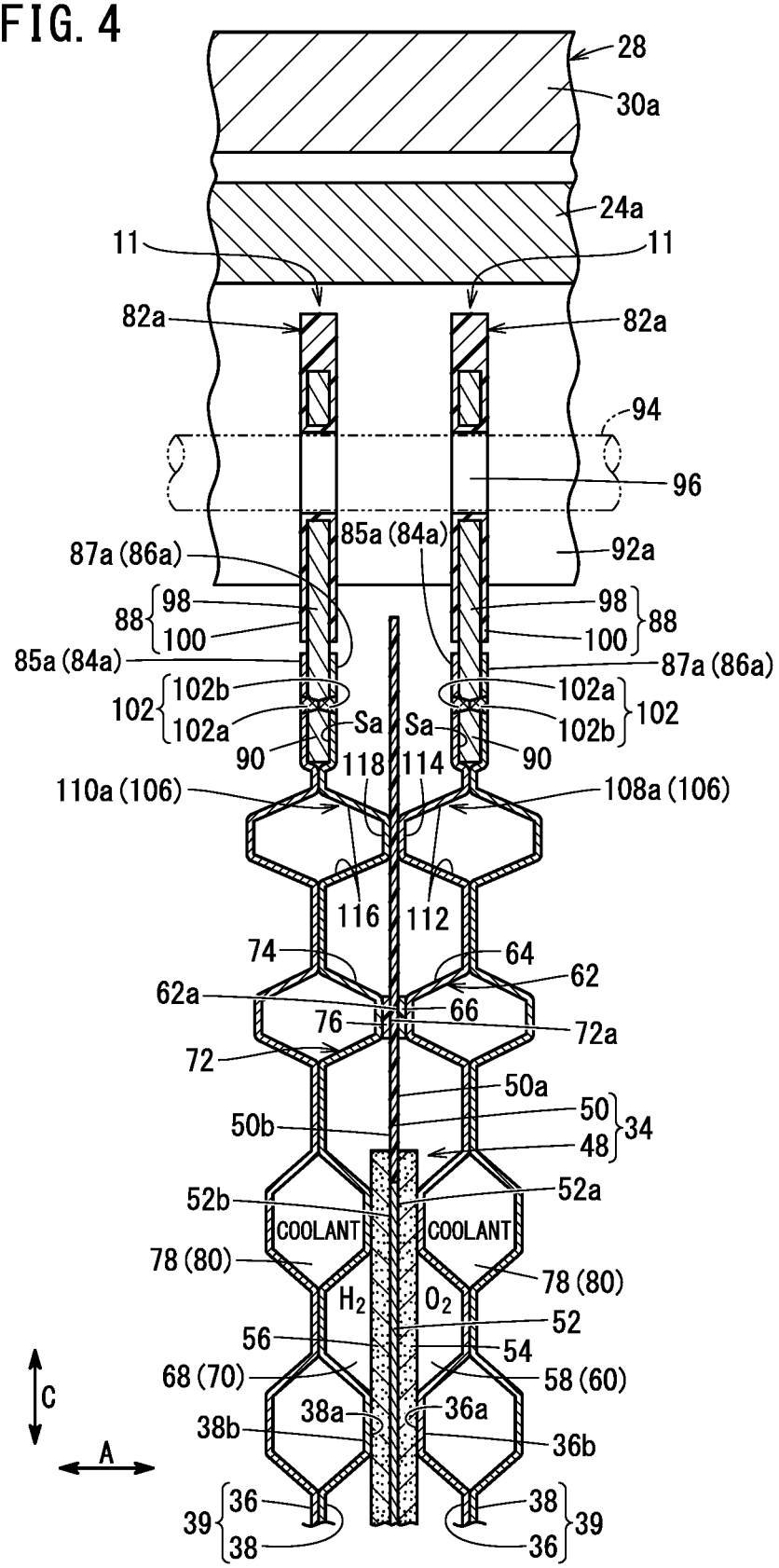
FIG. 4 is a cross sectional view taken along a line IV-IV in FIG. 2.

As shown in FIGS. 3 and 4, the resin frame equipped MEA 34 includes a membrane electrode assembly (hereinafter referred to as an "MEA 48"), and a resin frame member 50 (resin frame portion, resin film) including an overlap portion overlapped with the outer peripheral portion of the MEA 48, and formed around the outer peripheral portion. In FIG. 4, the MEA 48 includes an electrolyte membrane 52, a cathode 54 provided on one surface 52a of the electrolyte membrane 52, and an anode 56 provided on another surface 52b of the electrolyte membrane 52.

For example, the electrolyte membrane 52 is a solid polymer electrolyte membrane (cation ion exchange membrane). For example, the sold polymer electrolyte membrane is a thin membrane of perfluorosulfonic acid containing water. A fluorine based electrolyte may be used as the electrolyte membrane 52. Alternatively, an HC (hydrocarbon) based electrolyte may be used as the electrolyte membrane 52. The electrolyte membrane 52 is held between the cathode 54 and the anode 56.

Although not shown in details, the cathode 54 includes a first electrode catalyst layer joined to one surface 52a of the electrolyte membrane 52, and a first gas diffusion layer stacked on the first electrode catalyst layer. The first electrode catalyst layer is formed by depositing porous carbon particles uniformly on the surface of the first gas diffusion layer, and platinum alloy is supported on surfaces of the carbon particles.

The anode 56 includes a second electrode catalyst layer joined to the other surface 52b of the electrolyte membrane 52, and a second gas diffusion layer stacked on the second electrode catalyst layer. The second electrode catalyst layer is formed by depositing porous carbon particles uniformly on the surface of the second gas diffusion layer, and platinum alloy is supported on surfaces of the carbon particles. Each of the first gas diffusion layer and the second gas diffusion layer comprises a carbon paper, a carbon cloth, etc.

The surface size of the electrolyte membrane 52 is smaller than the surface sizes of the cathode 54 and the anode 56. The outer marginal portion of the cathode 54 and the outer marginal portion of the anode 56 hold the inner marginal portion of the resin frame member 50. The resin frame member 50 has non-impermeable structure where the reactant gases (the oxygen-containing gas and the fuel gas) do not pass through the resin frame member 50. The resin frame member 50 is provided on the outer peripheral side of the MEA 48.

The resin frame equipped MEA 34 may not use the resin frame member 50, and may use the electrolyte membrane 52 which protrude outward. Further, the resin frame equipped MEA 34 may be formed by providing frame shaped films on both sides of the protruding electrolyte membrane 52.

In FIG. 3, each of the first metal separator 36 and the second metal separator 38 has a rectangular (quadrangular) shape. Each of the first metal separator 36 and the second metal separator 38 is formed by press forming of a metal thin plate to have a corrugated shape in cross section and a wavy shape on the surface. For example, the metal plate is a steel plate, a stainless steel plate, an aluminum plate, a plated steel plate, or a metal plate having an anti-corrosive surface by surface treatment. In the state where the first metal separator 36 and the second metal separator 38 are overlapped with each other, outer ends thereof are joined together by welding, brazing, crimping, etc. integrally to form a joint separator 39.

As shown in FIGS. 3 and 4, the first metal separator 36 has an oxygen-containing gas flow field 58 on its surface 36a facing the MEA 48. The oxygen-containing gas flow field 58 is connected to the oxygen-containing gas supply passage 42a and the oxygen-containing gas discharge passage 42b. The oxygen-containing gas flow field 58 includes a plurality of oxygen-containing gas flow grooves 60 extending straight in the direction indicated by the arrow B. Each of the oxygen-containing gas flow grooves 60 may extend in the direction indicated by the arrow B in a wavy pattern.

A first seal 62 is provided on the first metal separator 36, around the outer peripheral portion of the first metal separator 36, for preventing leakage of fluid (oxygen-containing gas, fuel gas and coolant) to the outside from a portion between the MEA 34 and the first metal separator 36. The first seal 62 extends straight as viewed in the separator thickness direction (indicated by the arrow A). Alternatively, the first seal 62 may extend in a wavy pattern as viewed in the separator thickness direction.

In FIG. 4, the first seal 62 includes a first metal bead 64 formed integrally with the first metal separator 36, and a first resin member 66 provided on the first metal bead 64. The first metal bead 64 protrudes from the first metal separator 36 toward the resin frame member 50. The first metal bead 64 has a trapezoidal shape in lateral cross section which is tapered (narrowed) in a protruding direction in which the first metal bead 64 protrudes. The first resin member 66 is an elastic member fixed to the protruding end surface of the first metal bead 64 by printing or coating, etc. For example, polyester fiber may be used as the first resin member 66.

As shown in FIGS. 3 and 4, the second metal separator 38 has a fuel gas flow field 68 on its surface 38a facing the MEA 48. The fuel gas flow field 68 is connected to the fuel gas supply passage 46a and the fuel gas discharge passage 46b (see also FIG. 10B). The fuel gas flow field 68 includes a plurality of fuel gas flow grooves 70 extending in the direction indicated by the arrow B. Each of the fuel gas flow grooves 70 may extend in a wavy pattern in the direction indicated by the arrow B.

A second seal 72 is provided on the second metal separator 38, around the outer peripheral portion of the second metal separator 38, for preventing leakage of the fluid (oxygen-containing gas, fuel gas, and coolant) to the outside from a portion between the MEA 34 and the second metal separator 38. The second seal 72 extends straight as viewed in the separator thickness direction (indicated by the arrow A). Alternatively, the second seal 72 may extend in a wavy pattern as viewed in the separator thickness direction.

In FIG. 4, the second seal 72 includes a second metal bead 74 formed integrally with the second metal separator 38, and a second resin member 76 provided on the second metal bead 74. The second metal bead 74 protrudes from the second metal separator 38 toward the resin frame member 50. The second metal bead 74 has a trapezoidal shape in lateral cross section which is tapered (narrowed) in a protruding direction in which the second metal bead 74 protrudes. The second resin member 76 is an elastic member fixed to the protruding end surface of the second metal bead 74 by printing or coating, etc. For example, polyester fiber may be used as the second resin member 76.

The first seal 62 and the second seal 72 are arranged in a manner that the first seal 62 and the second seal 72 are overlapped with each other as viewed in the separator thickness direction. Therefore, in the state where the tightening load is applied to the fuel cell stack 10, each of the first metal bead 64 and the second metal bead 74 is elastically deformed (deformed by compression). Further, in this state, a protruding end surface 62a of the first seal 62 (first resin member 66) contacts one surface 50a of the resin frame member 50 in an air tight and liquid tight manner, and a protruding end surface 72a of the second seal 72 (second resin member 76) contacts another surface 50b of the resin frame member 50 in an air tight and liquid tight manner.

The first resin member 66 may be provided on one surface 50a of the resin frame member 50 instead of the first metal bead 64. The second resin member 76 may be provided on the other surface 50b of the resin frame member 50 instead of the second metal bead 74. Further, at least one of the first resin member 66 and the second resin member 76 may be dispensed with. The first seal 62 and the second seal 72 may be elastic rubber members instead of metal bead seals.

In FIGS. 3 and 4, a coolant flow field 78 is provided between a surface 36b of the first metal separator 36 and a surface 38b of the second metal separator 38. The coolant flow field 78 is connected to the coolant supply passage 44a and the coolant discharge passage 44b. The coolant flow field 78 includes a plurality of coolant flow grooves 80 extending straight in the direction indicated by the arrow B. The coolant flow field 78 is formed on the back surface of the oxygen-containing gas flow field 58 and the back surface of the fuel gas flow field 68.

As shown in FIGS. 2 to 4, the stack body 14 of the fuel cell stack 10 is formed by stacking the resin frame equipped MEAs 34 and fuel cell separator members 11 together alternately. Each of the fuel cell separator members 11 includes the joint separator 39, and two load receiver members 82a, 82b provided on the joint separator 39 in a manner to protrude from the outer peripheral portion of the joint separator 39.

As shown in FIGS. 2 and 3, two first support portions 84a, 84b are provided in the first metal separator 36. The first support portion 84a protrudes outward (in the direction indicated by the arrow C) from one of the long sides (outer peripheral portion) of the first metal separator 36. The position of the first support portion 84a is shifted from the center of one of the long sides of the first metal separator 36 toward one end of the first metal separator 36 in a manner that the first support portion 84a faces the coupling member 24a. The first support portion 84a is provided integrally with the outer peripheral portion of the first metal separator 36 by press forming. The first support portion 84a supports the load receiver member 82a.

The first support portion 84b protrudes outward (in the direction indicated by the arrow C) from the other of the long sides (outer peripheral portion) of the first metal separator 36. The position of the first support portion 84b is shifted from the center of the other of the long sides of the first metal separator 36 toward the other end of the first metal separator 36 in a manner that the first support portion 84b faces the coupling member 24b. The first support portion 84b is provided integrally with the outer peripheral portion of the first metal separator 36 by press forming.

In the joint separator 39, the first support portions 84a, 84b may be formed as members separate from the first metal separator 36, and the first support portions 84a, 84b may be joined to the first metal separator 36. The first support portions 84a, 84b may not protrude outward from the outer peripheral portion of the first metal separator 36.

As shown in FIG. 3, two second support portions 86a, 86b are provided in the second metal separator 38. The second support portion 86a protrudes outward (in the direction indicated by the arrow C) from one of the long sides (outer peripheral portion) of the second metal separator 38. The second support portion 86a faces the first support portion 84a. The second support portion 86a is provided integrally with the outer peripheral portion of the second metal separator 38 by press forming. The second support portion 86a supports the load receiver member 82a.

The second support portion 86b protrudes outward (in the direction indicated by the arrow C) from the other of the long sides (outer peripheral portion) of the second metal separator 38. The second support portion 86b faces the first support portion 84b. The second support portion 86b is provided integrally with the outer peripheral portion of the second metal separator 38 by press forming. The second support portion 86b supports the load receiver member 82b.

In the joint separator 39, the second support portions 86a, 86b and the second metal separator 38 may be formed as separate members, and the second support portions 86a, 86b may be joined to the second metal separator 38. The second support portions 86a, 86b may not protrude outward from the outer peripheral portion of the second metal separator 38.

As shown in FIGS. 3 to 7, in the joint separator 39, the first support portion 84a is provided with a first expansion 85a expanded in a protruding direction in which the first metal bead 64 protrudes (in the direction opposite to the direction toward the mating surface of the joint separator 39, in the direction opposite to the direction toward the contact surface of the first metal separator 36 which contacts the second metal separator 38). The second support portion 86a is provided with a second expansion 87a expanded in a protruding direction in which the second metal bead 74 protrudes (in the direction opposite to the direction toward the mating surface of the joint separator 39, in the direction opposite to the direction toward the contact surface of the second metal separator 38 which contacts the first metal separator 36). A gap Sa is formed between the first expansion 85a and the second expansion 87a. An attachment portion 90, described later, of the load receiver member 82a is disposed in the gap Sa. The length La of the gap Sa in the separator thickness direction (in the direction indicated by the arrow A) is calculated by summing the length La1, in the direction indicated by the arrow A, of the gap formed by the first expansion 85a, and the length La2 of the gap formed by the second expansion 87a. The length La1 is a distance from the mating surface (contact surfaces) between the first support portion 84a and the second support portion 86a to the inner surface of the first expansion 85a (surface adjacent to the second expansion 87a). The length La2 is a distance from the mating surface (contact surfaces) between the first support portion 84a and the second support portion 86a to the inner surface of the second expansion 87a (surface adjacent to the first expansion 85a). The length La1 and the length La2 are the same.

In the joint separator 39, the first support portion 84b is provided with a first expansion 85b expanded in a protruding direction in which the first metal bead 64 protrudes (in the direction opposite to the direction toward the mating surface of the joint separator 39, in the direction opposite to the direction toward the contact surface of the first metal separator 36 which contacts the second metal separator 38). The second support portion 86b is provided with a second expansion 87b expanded in a protruding direction in which the second metal bead 74 protrudes (in the direction opposite to the direction toward the mating surface of the joint separator 39, in the direction opposite to the direction toward the contact surface of the second metal separator 38 which contacts the first metal separator 36). A gap Sb is formed between the first expansion 85b and the second expansion 87b. The attachment portion 90, described later, of the load receiver member 82b is disposed in the gap Sb. The length Lb of the space Sb in the separator thickness direction (in the direction indicated by the arrow A) includes the length Lb1, in the direction indicated by the arrow A, of the gap formed by the first expansion 85b, and the length Lb2, in the direction indicated by the arrow A, of the gap formed by the second expansion 87b. The length Lb1 is a distance from the mating surface (contact surfaces) between the first support portion 84b and the second support portion 86b to the inner surface of the first expansion 85b (surface adjacent to the second expansion 87b). The length Lb2 is a distance from the mating surface (contact surfaces) between the first support portion 84b and the second support portion 86b to the inner surface of the second expansion 87b (surface adjacent to the first expansion 85b). The length Lb1 and the length Lb2 are the same.

Figure 5:
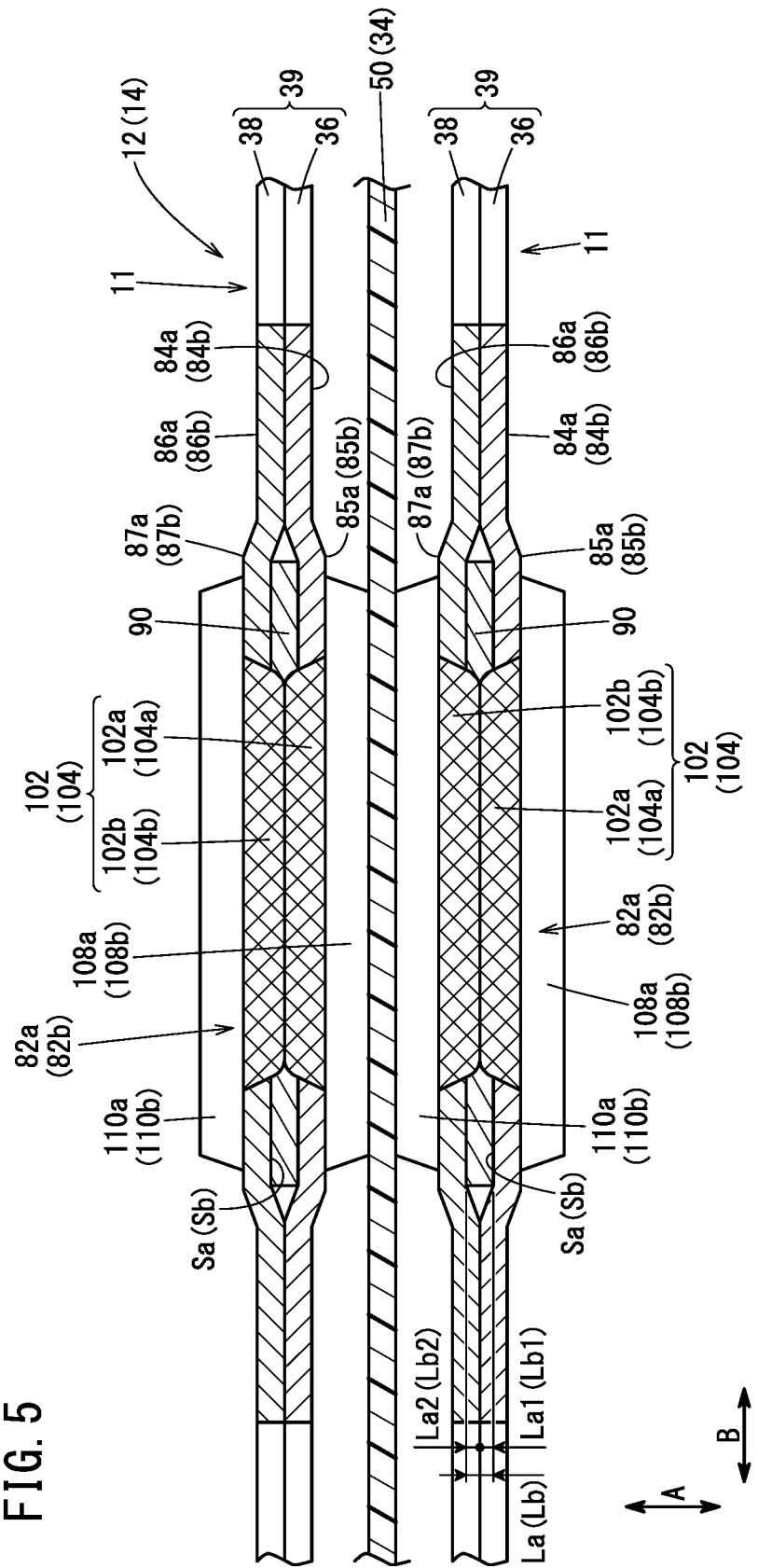
FIG. 5 is a cross sectional view taken along a line V-V in FIG. 2.
Figure 7:
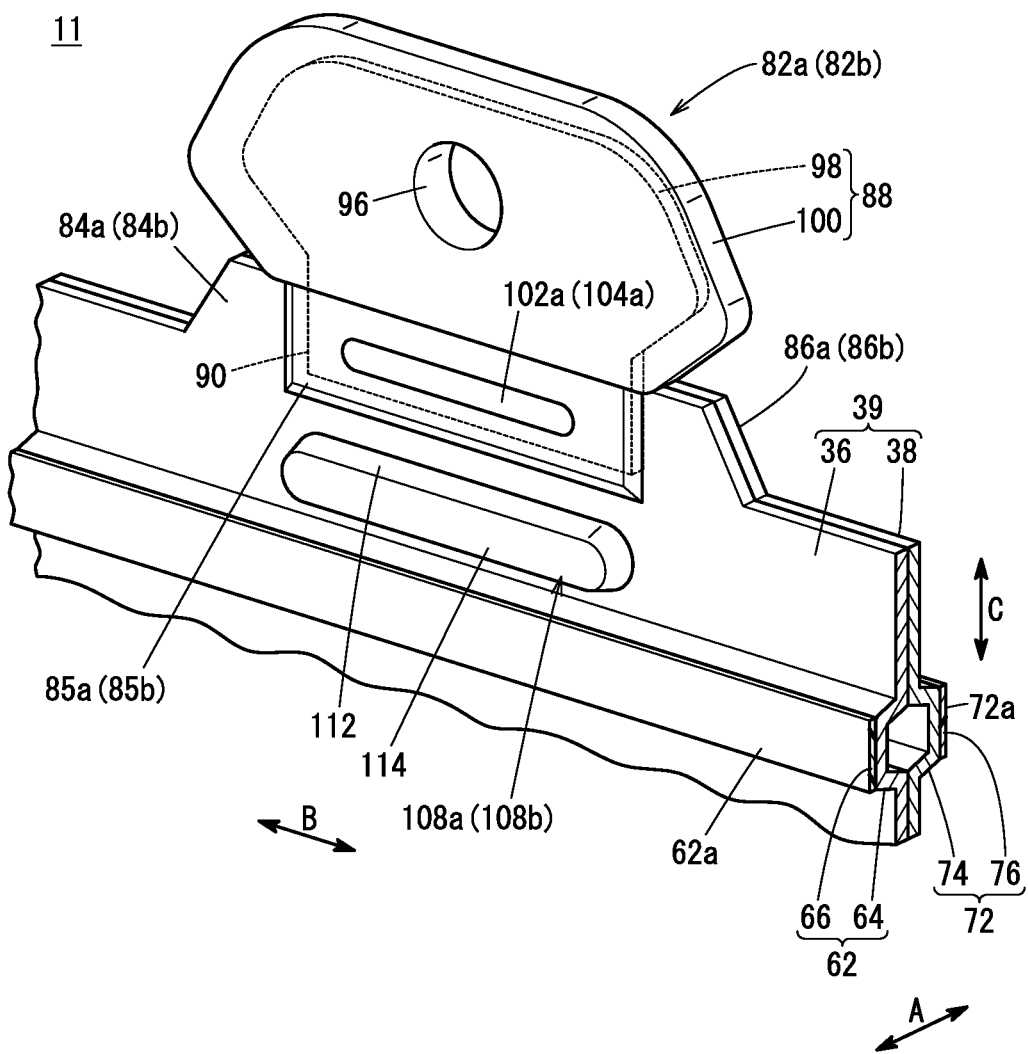
FIG. 7 is a partial enlarged perspective view of the fuel cell separator member shown in FIG. 3.
Figure 8:
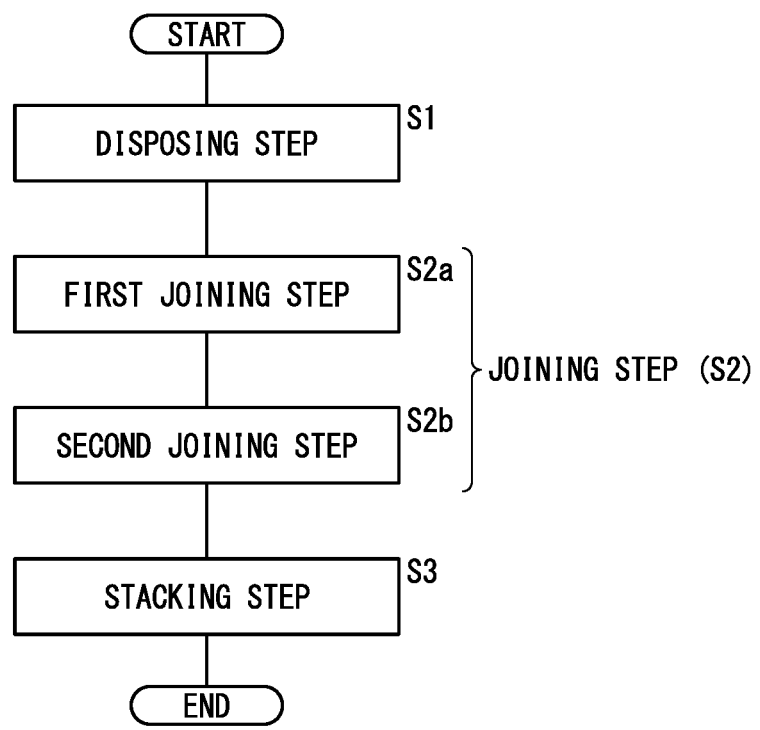
FIG. 8 is a flow chart showing a method of producing the fuel cell stack.

As shown in FIGS. 5 and 7, the portion of the outer peripheral end of the first metal separator 36 other than the first expansions 85a, 85b and the portion of the outer peripheral end of the second metal separator 38 other than the second expansions 87a, 87b contact each other. However, the outer peripheral end of the first metal separator 36 and the outer peripheral end of the second metal separator 38 may be spaced from each other over the entire periphery.

Figure 6:
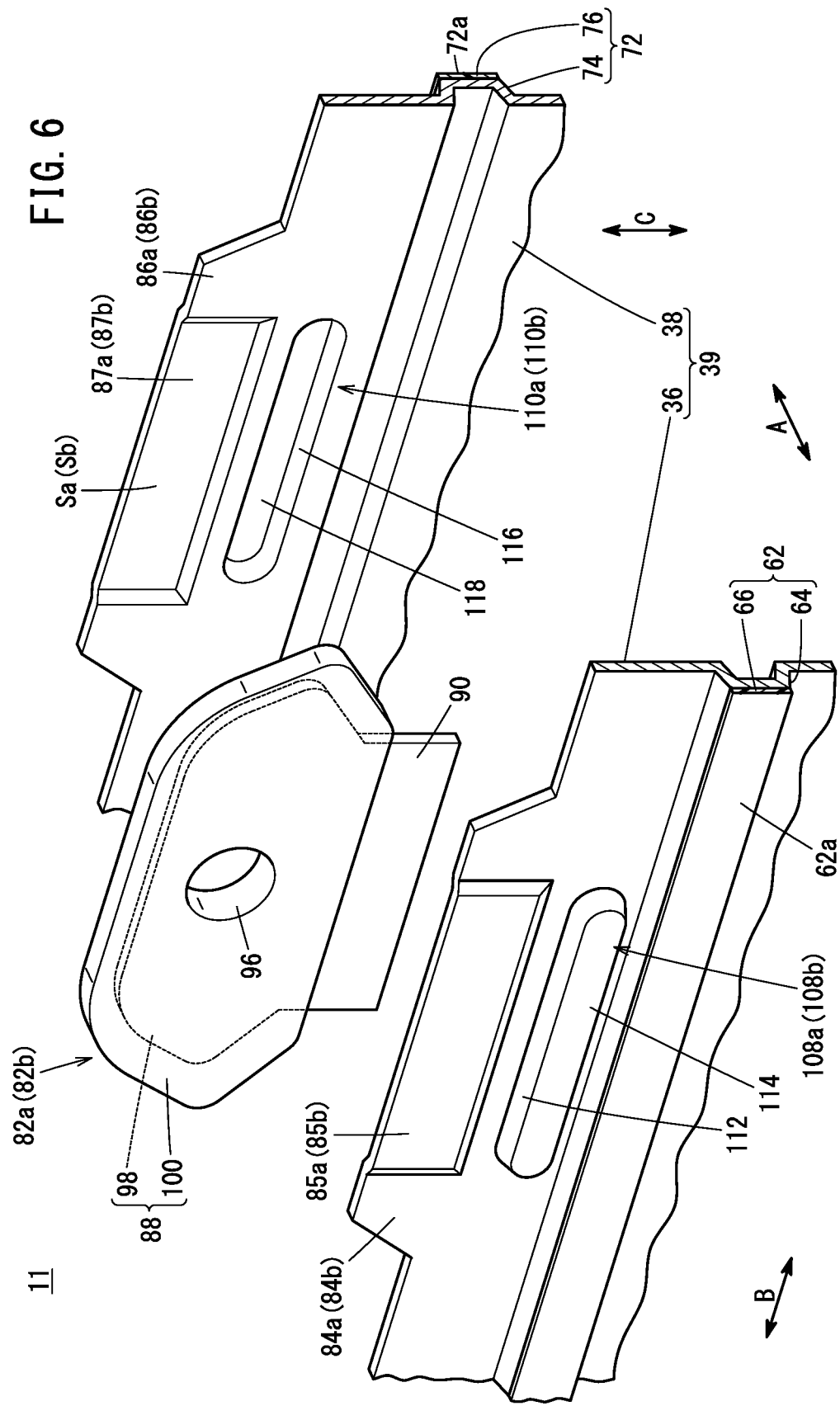
FIG. 6 is a partial expanded exploded perspective view of a fuel cell separator member shown in FIG. 3.

As shown in FIGS. 4, 6, and 7, the load receiver member 82a includes a tab 88 and the attachment portion 90. The tab 88 protrudes outward in the direction indicated by the arrow C from the outer peripheral portion (the first support portion 84a and the second support portion 86a) of the joint separator 39.

The tab 88 of the load receiver member 82a is inserted into a recess 92a formed in the coupling member 24a (see FIG. 2). It should be noted that the coupling member 24a may be formed integrally with the cover 28. The coupling member 24b may be formed integrally with the cover 28 as well. In FIG. 4, a positioning hole 96 is formed at the center of the tab 88. A rod 94 for positioning each of the fuel cell separator members 11 is inserted into the positioning hole 96 at the time of producing the fuel cell stack 10. It should be noted that the rod 94 may be extracted from the positioning hole 96 after positioning of each of the fuel cell separator members 11 is completed. Alternatively, the rod 94 may be left in the positioning hole 96.

As shown in FIGS. 4, 6, and 7, the tab 88 includes a base portion 98 forming the outer shape, and an insulating portion 100 covering the outer surface of the base portion 98. The base portion 98 and the attachment portion 90 are formed integrally by press forming of the single metal plate. Materials of the base portion 98 and the attachment portion 90 include the same materials as the materials of the first metal separator 36 and the second metal separator 38. The insulating portion 100 interrupts electrical connection between the base portion 98 and the coupling member 24a. Further, the insulating portion 100 covers a surface forming the positioning hole 96 in the base portion 98.

In FIGS. 4 and 5, the attachment portion 90 is disposed in the gap Sa formed between the first expansion 85a and the second expansion 87a. The attachment portion 90 has a substantially rectangular shape, and extends in the direction indicated by the arrow B (direction perpendicular to a protruding direction in which the load receiver member 82a protrudes and to the separator thickness direction) (FIGS. 6 and 7). The attachment portion 90 is exposed from the insulating portion 100. In the state where the attachment portion 90 of the load receiver member 82a is disposed in the gap Sa between the first expansion 85a and the second expansion 87a, the attachment portion 90 of the load receiver member 82a is joined to the joint separator 39 by a joint portion 102.

The joint portion 102 includes a first joint portion 102a and a second joint portion 102b. The first joint portion 102a joins the first expansion 85a and the attachment portion 90 of the load receiver member 82a together. The second joint portion 102b joins the second expansion 87a and the attachment portion 90 of the load receiver member 82a together.

Each of the first joint portion 102a and the second joint portion 102b is formed by spot welding, laser welding, MIG welding, TIG welding, brazing, etc. Each of the first joint portion 102a and the second joint portion 102b extends in the longitudinal direction (indicate by the arrow B) of the attachment portion 90 (see FIG. 5). The first joint portion 102a and the second joint portion 102b are coupled together.

In FIGS. 3, 6, and 7, the load receiver member 82b has the same structure as above the load receiver member 82a. Stated otherwise, the load receiver member 82b has a shape formed by inverting the shape of the load receiver member 82a in the direction indicated by the arrow C. Therefore, the description about the detailed structure of the load receiver member 82b is omitted. It should be noted that the tab 88 of the load receiver member 82b is inserted into a recess 92b formed in the coupling member 24b (see FIG. 2).

Further, in the state where the attachment portion 90 of the load receiver member 82b is provided in the gap Sb formed between the first expansion 85b and the second expansion 87b, the attachment portion 90 of the load receiver member 82b is joined to the joint separator 39 by a joint portion 104. In FIGS. 3, 7, 10A, and 10B, the joint portion 104 includes a first joint portion 104a and a second joint portion 104b. The first joint portion 104a joins the first expansion 85b and the attachment portion 90 of the load receiver member 82b together. The second joint portion 104b joins the second expansion 87b and the attachment portion 90 of the load receiver member 82b together.

As shown in FIGS. 3 to 7, the joint separator 39 is provided with a reinforcement rib 106. The rib 106 includes first ribs 108a, 108b formed on the surface 36a of the first metal separator 36 so as to protrude therefrom, and second ribs 110a, 110b formed on the surface 38a of the second metal separator 38 so as to protrude therefrom.

In FIGS. 4, 6, and 7, the first ribs 108a, 108b protrude in a protruding direction in which the first metal bead 64 protrudes (direction opposite to the direction toward the mating surface of the joint separator 39, direction opposite to the direction toward the contact surface of the first metal separator 36 which contacts the second metal separator 38). The first rib 108a is positioned between the first seal 62 and the first expansion 85a of the first metal separator 36. Stated otherwise, the first rib 108a is positioned opposite to the tab 88 of the load receiver member 82a with respect to the first joint portion 102a. The first rib 108a is positioned adjacent to the first joint portion 102a. The first rib 108a extends straight in the extending direction in which the first joint portion 102a extends (in the direction indicated by the arrow B). The first rib 108a extends in the direction indicated by the arrow B along the attachment portion 90 of the load receiver member 82a substantially by the same size as the attachment portion 90.

As shown FIG. 4, the first rib 108a has a trapezoidal shape in lateral cross section which is tapered (narrowed) in a protruding direction in which the first rib 108a protrudes. That is, the first rib 108a includes first side walls 112 on both sides, inclined in the separator thickness direction (indicated by the arrow A), and a first coupling wall 114 connecting protruding ends of these first side walls 112. The first side walls 112 are inclined toward the resin frame member 50 in a direction closer to each other, toward the resin frame member 50.

As shown in FIG. 6, the first rib 108b is positioned between the first seal 62 and the first expansion 85b. Stated otherwise, the first rib 108b is positioned opposite to the tab 88 of the load receiver member 82b with respect to the first joint portion 104a. The first rib 108b is positioned adjacent to the first joint portion 104a. The first rib 108b has the same structure as the above-described first rib 108a. Therefore, the description of the first rib 108b is omitted.

As shown in FIGS. 4 and 6, the second ribs 110a, 110b protrude in a protruding direction in which the second metal bead 74 protrudes (in the direction opposite to the direction toward the mating surface of the joint separator 39, in the direction opposite to the direction toward the contact surface of the first metal separator 36 which contacts the second metal separator 38. The second rib 110a is positioned between the second seal 72 and the second expansion 87a of the second metal separator 38. Stated otherwise, the second rib 110a is positioned opposite to the tab 88 of the load receiver member 82a with respect to a second joint portion 102b. The second rib 110a is positioned adjacent to the second joint portion 102b. The second rib 110a extends straight in the direction in which the second joint portion 102b extends (indicated by the arrow B). The second rib 110a extends in the direction indicated by the arrow B along the attachment portion 90 of the load receiver member 82a by substantially the same length of the attachment portion 90.

As shown in FIG. 4, the second rib 110a has a trapezoidal shape in lateral cross section which is tapered (narrowed) in a protruding direction in which the second rib 110a protrudes. That is, the second rib 110a includes second side walls 116 on both sides, inclined from the separator thickness direction (indicated by the arrow A), and a second coupling wall 118 connecting protruding ends of these second seal walls 116. The second side walls 116 are inclined in a direction closer to each other toward the resin frame member 50.

As shown in FIG. 6, the second rib 110b is positioned between the second seal 72 and the second expansion 87b. Stated otherwise, the second rib 110b is positioned opposite to the tab 88 of the load receiver member 82b with respect to the second joint portion 104b. The second rib 110b is positioned adjacent to the second joint portion 104b. The second rib 110b has the same structure as the second rib 110a described above. Therefore, description about the structure of the second rib 110b is omitted.

The first rib 108a and the second rib 110a are positioned in a manner that the first rib 108a and the second rib 110a are overlapped with each other as viewed in the separator thickness direction (indicated by the arrow A). Therefore, in the state where the tightening load is applied to the fuel cell stack 10, the protruding end surface of the first rib 108a contacts one surface 50a of the resin frame member 50, and the protruding end surface of the second rib 110a contacts the other surface 50b of the resin frame member 50. At this time, the tightening load is not applied to the first rib 108a and the second rib 110a. That is, the first rib 108a and the second rib 110a are not deformed elastically. Therefore, the surface pressure of the first seal 62 and the second seal 72 cannot be released by the first rib 108a and the second rib 110a. The surface pressure of the first seal 62 and the second seal 72 cannot be released by the first rib 108b and the second rib 110b as well.

Next, the method of producing the fuel cell stack 10 having the above structure will be described.

In the method of producing the fuel cell stack 10, a disposing step, a joining step, and a stacking step shown in FIG. 7 are performed successively. It is assumed that the first metal separator 36, the second metal separator 38, and the load receiver members 82a, 82b, and the resin frame equipped MEA 34, etc. are produced before the disposing step.

In the disposing step (step S1), as shown in FIG. 9, the load receiver members 82a, 82b are disposed between the outer peripheral portion of the first metal separator 36 and the outer peripheral portion of the second metal separator 38. Specifically, the attachment portion 90 of the load receiver member 82a is disposed in the gap Sa between the first expansion 85a of the first metal separator 36 and the second expansion 87a of the second metal separator 38. Further, the attachment portion 90 of the load receiver member 82b is disposed in the gap Sb between the first expansion 85b of the first metal separator 36 and the second expansion 87b of the second metal separator 38.

Figure 10A:
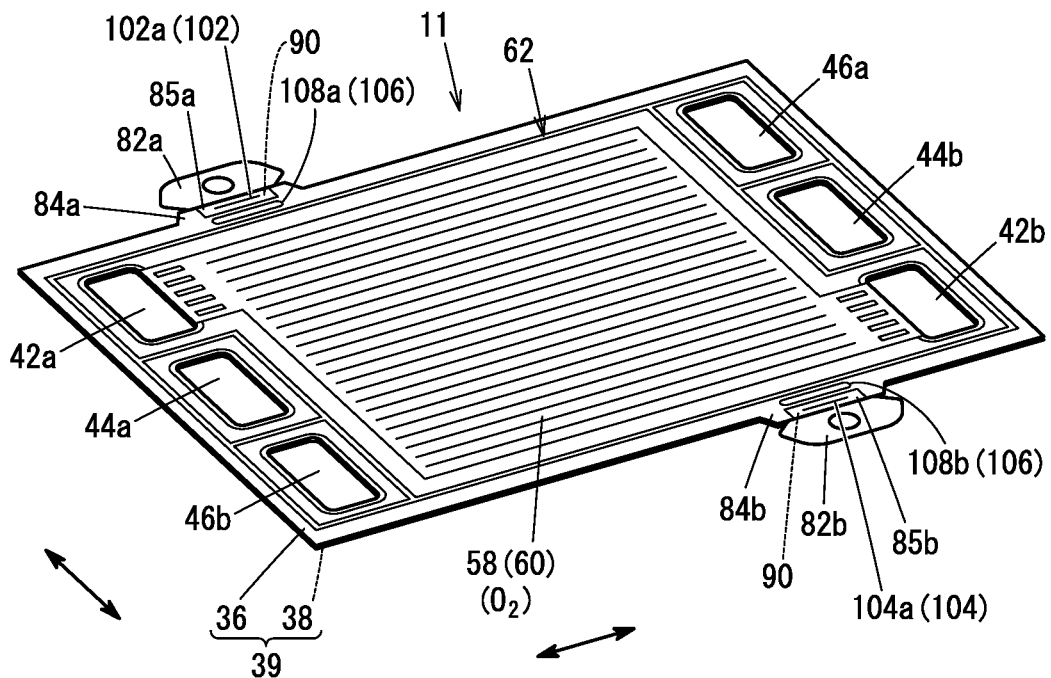
FIG. 10A is a view showing a first joining step.

The joining step (step S2) includes a first joining step (step S2a) and a second joining step (step S2b). As shown in FIG. 10A, in the first joining step, the first expansion 85a and the attachment portion 90 of the load receiver member 82a are joined together, and the first expansion 85b and the attachment portion 90 of the load receiver member 82b are joined together. Thus, first joint portions 102a, 104a are formed.

Figure 10B:
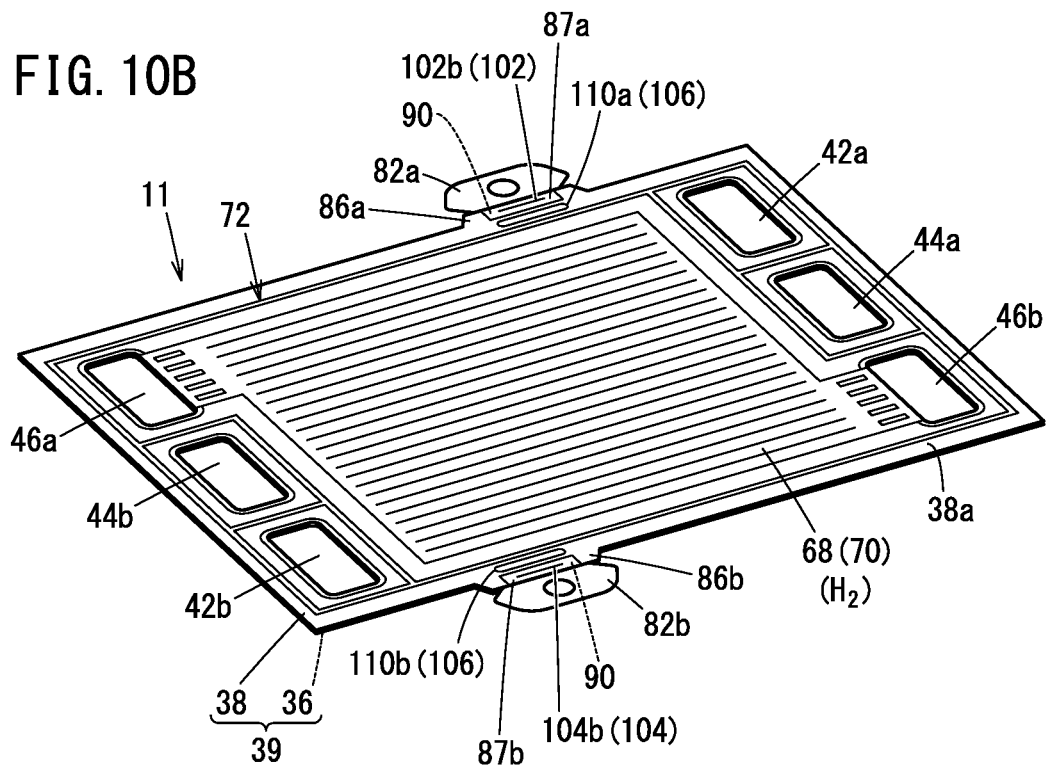
FIG. 10B is a view showing a second joining step.

As shown in FIG. 10B, in the second joining step, the second expansion 87a and the attachment portion 90 of the load receiver member 82a are joined together, and the second expansion 87b and the attachment portion 90 of the load receiver member 82b are joined together. Thus, second joint portions 102b, 104b are formed. In the joining step, the outer peripheral portion of the first metal separator 36 and the outer peripheral portion of the second metal separator 38 are joined together to form the joint separator 39. In this manner, the fuel cell separator member 11 is produced.

Figure 11:
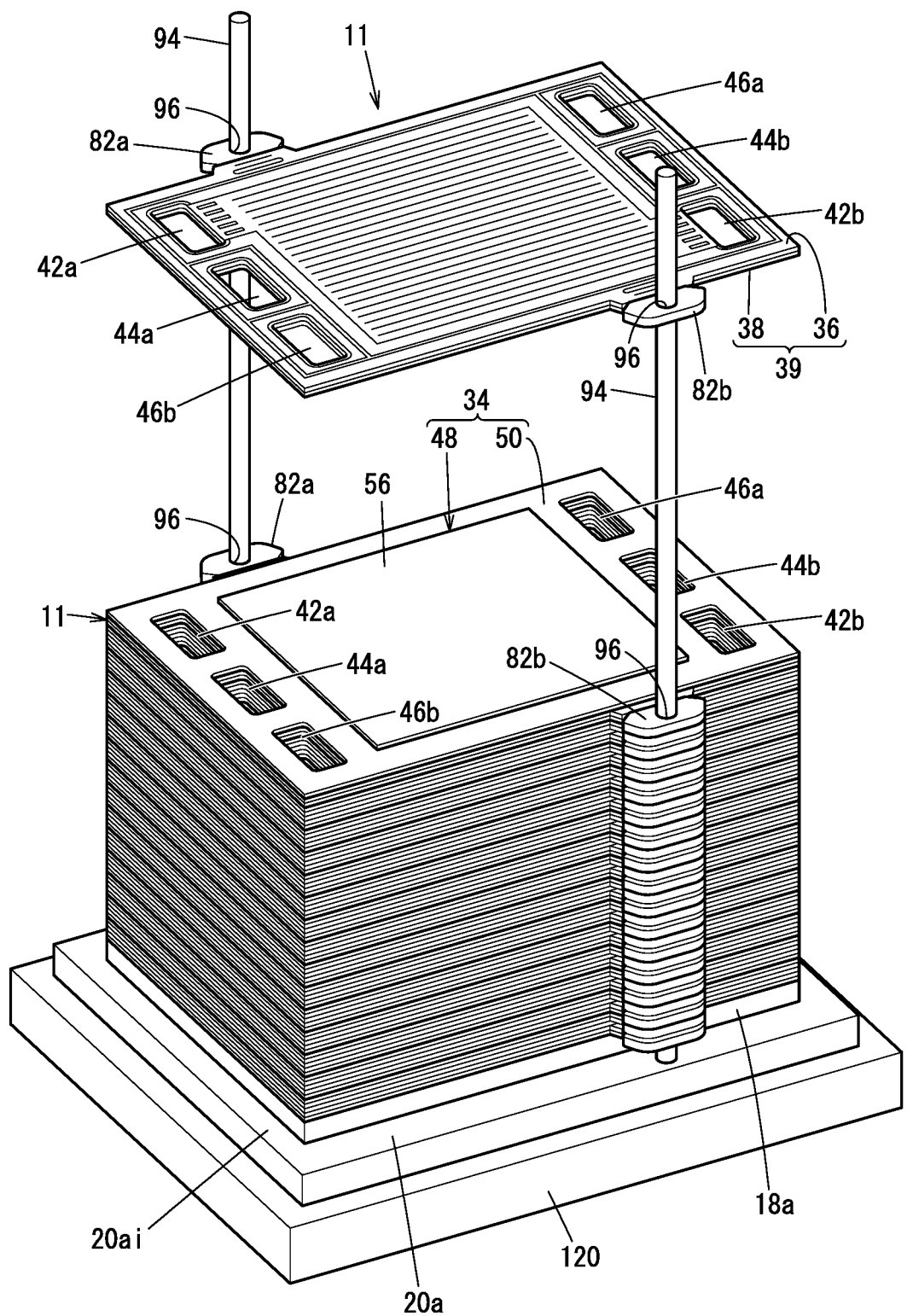
FIG. 11 is a first view showing a stacking step.

As shown in FIG. 11, in the stacking step (step S3), firstly, at the time of disposing the end plate 20a on a base frame 120, an inner surface 20ai of the end plate 20a is oriented upward (in the direction opposite to the direction toward the base frame 120). Then, the rod 94 is inserted into a hole formed in the inner surface 20ai of the end plate 20a Thereafter, the fuel cell separator members 11 and the resin frame equipped MEAs 34 are stacked together alternately on the insulator 18a and the terminal plate 16a stacked on the inner surface 20ai of the end plate 20a. Specifically, the rods 94 are inserted into the positioning holes 96 of the load receiver members 82a, 82b, and the fuel cell separator members 11 are moved toward the end plate 20a.

Figure 12:
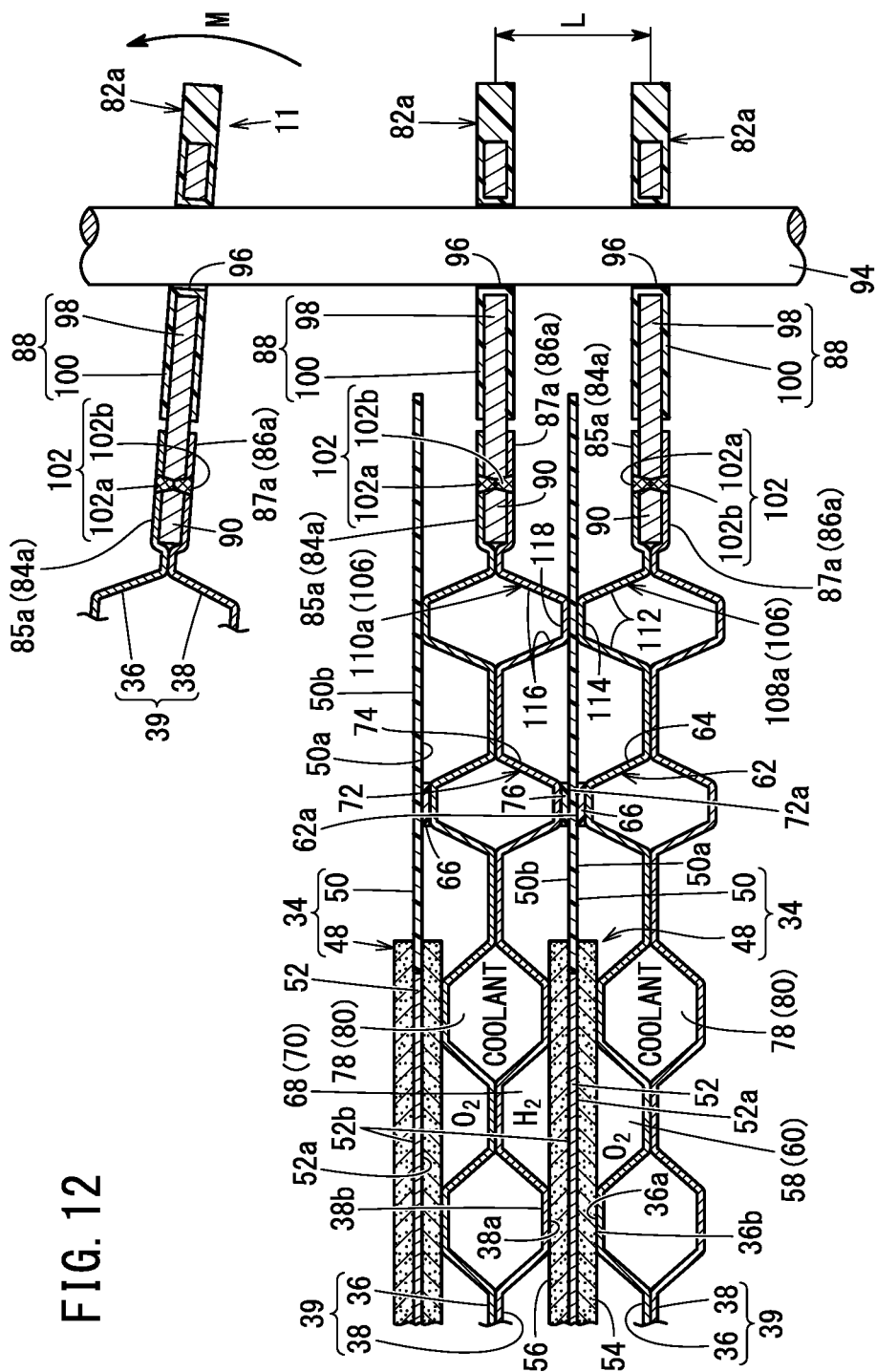
FIG. 12 is a second view showing the stacking step.

In this regard, as shown in FIG. 12, the outer peripheral surface of the rod 94 may contact the inner surfaces forming the positioning holes 96, and bending moment M may be applied to the load receiver members 82a, 82b. However, in the embodiment of the present invention, in the state where the attachment portions 90 of the load receiver members 82a, 82b is provided between the first expansions 85a, 85b and the second expansions 87a, 87b, the attachment portions 90 of the load receiver members 82a, 82b are joined to the joint separator 39 by the joint portions 102, 104.

Therefore, it is possible to reduce the situations where the load receiver members 82a, 82b which received the bending moment M are tilted and deformed with respect to the first metal separator 36 and the second metal separator 38. Thus, it is possible to ensure that distances L between the load receiver members 82a, 82b that are adjacent to each other in the stacking direction of the first metal separator 36 and the second metal separator 38 become substantially constant.

After the stacking step is completed, as shown in FIG. 1, the terminal plate 16b and the insulator 18b are overlapped on the other end side of the stack body 14, and the rod 94 is removed from the end plate 20a. Further, the end plate 20b is overlapped on the insulator 18b in a manner that the plurality of coupling members 24a to 24d are positioned between the end plate 20a and the end plate 20b. At this time, the tab 88 of the load receiver member 82a is inserted into the recess 92a of the coupling member 24a, and the tab 88 of the load receiver member 82b is inserted into the recess 92b of the coupling member 24b. Then, by tightening the coupling members 24a to 24d using the bolts 26, the tightening load (compression load) is applied to the stack body 14. Thereafter, the side panels 30a to 30d are assembled to the end plates 20a, 20b. As a result, production of the fuel cell stack 10 is completed.

Next, operation of the fuel cell stack 10 having the above structure will be described.

Firstly, as shown in FIG. 1, the oxygen-containing gas is supplied to the oxygen-containing gas supply passage 42a of the end plate 20a. The fuel gas is supplied to the fuel gas supply passage 46a of the end plate 20a. The coolant is supplied to the coolant supply passage 44a of the end plate 20a.

As shown in FIG. 3, the oxygen-containing gas flows from the oxygen-containing gas supply passage 42a into the oxygen-containing gas flow field 58 of the first metal separator 36. The oxygen-containing gas moves along the oxygen-containing gas flow field 58 in the direction indicated by the arrow B, and the oxygen-containing gas is supplied to the cathode 54 of the MEA 48.

In the meanwhile, the fuel gas flows from the fuel gas supply passage 46a into the fuel gas flow field 68 of the second metal separator 38. The fuel gas moves along the fuel gas flow field 68 in the direction indicated by the arrow B, and the fuel gas is supplied to the anode 56 of the MEA 48.

Thus, in each of the MEA 48, the oxygen-containing gas supplied to the cathode 54 and the fuel gas supplied to the anode 56 is partially consumed in electrochemical reactions to generate electricity.

Then, the oxygen-containing gas supplied to the cathode 54 is partially consumed at the cathode, and the oxygen-containing gas is discharged along the oxygen-containing gas discharge passage 42b in the direction indicated by the arrow A. Likewise, the fuel gas supplied to the anode 56 is partially consumed at the anode, and the fuel gas is discharged along the fuel gas discharge passage 46b in the direction indicated by the arrow A.

Further, the coolant supplied to the coolant supply passage 44a flows into the coolant flow field 78 formed between the first metal separator 36 and the second metal separator 38, and then, the coolant flows in the direction indicated by the arrow B. After the coolant cools the MEA 48, the coolant is discharged from the coolant discharge passage 44b.

In the embodiment of the present invention, when an external load in the direction indicated by the arrow B is applied to the fuel cell stack 10 from the outside, the tab 88 of the load receiver member 82a contacts the wall surface of the recess 92a of the coupling member 24a, and the tab 88 of the load receiver member 82b contacts the wall surface of the recess 92b of the coupling member 24b. In this manner, positional displacement of the fuel cell separator member 11 in the direction indicated by the arrow B is suppressed.

The fuel cell separator member 11 and the fuel cell stack 10 according to the embodiment of the present invention offer the following advantages.

The load receiver member 82a, 82b includes the attachment portion 90 disposed between the outer peripheral portion of the first metal separator 36 and the outer peripheral portion of the second metal separator 38, and the tab 88 continuous with the attachment portion 90 and protruding from the outer peripheral portion of the joint separator 39. The attachment portion 90 is joined to the joint separator 39 by the joint portion 102, 104.

In the structure, the attachment portion 90 is supported by the first metal separator 36 and the second metal separator 38 from both sides. Therefore, the load receiver members 82a, 82b are not tilted and deformed easily in the separator thickness direction with respect to the joint separator 39. Further, with the simple structure, it is possible to achieve improvement in the joining strength of joining the load receiver members 82a, 82b and the joint separator 39.

The joint portion 102 includes the first joint portion 102a configured to join the outer peripheral portion of the first metal separator 36 and the attachment portion 90 together, and the second joint portion 102b configured to join the outer peripheral portion of the second metal separator 38 and the attachment portion 90 together.

In the structure, it is possible to achieve further improvement in the joining strength of joining the load receiver members 82a, 82b and the joint separator 39.

The joint separator 39 is provided with the reinforcement rib 106 protruding in the separator thickness direction, and the rib 106 is positioned on the side opposite to the tab 88 with respect to the joint portion 102, 104.

In the structure, it is possible to achieve further improvement in the joining strength of joining the load receiver members 82a, 82b and the joint separator 39 by the rib 106.

The rib 106 includes the first rib 108a, 108b protruding from the outer peripheral portion of the first metal separator 36 toward the side opposite to the second metal separator 38, and the second rib 110a, 110b protruding from the outer peripheral portion of the second metal separator 38 toward the side opposite to the first metal separator 36.

In the structure, it is possible to achieve further improvement in the joining strength of joining the load receiver members 82a, 82b and the joint separator 39 by the first ribs 108a, 108b, and the second ribs 110a, 110b.

The first expansion 85a expanded toward the side opposite to the second metal separator 38 is provided at the portion (the first support portions 84a, 84b) of the outer peripheral portion of the first metal separator 36, the portion supporting the attachment portion 90. The second expansion 87a expanded toward the side opposite to the first metal separator 36 is provided at the portion (second support portions 86a, 86b) of the outer peripheral portion of the second metal separator 38, the portion supporting the attachment portion 90. The outer peripheral end of the first metal separator 36 and the outer peripheral end of the second metal separator 38 contact each other in the portion other than the first expansion 85a and the second expansion 87a.

In the structure, it is possible to improve the rigidity of the first support portions 84a, 84b by the first expansion 85a. Further, it is possible to improve the rigidity of the second support portions 86a, 86b by the second expansion 87a.

The present invention is not limited to the above-described embodiments. Various modifications can be made without departing from the gist of the present invention.

The above-described embodiment is summarized as follows:

The above-described embodiment discloses the fuel cell separator member (11), including the joint separator (39) formed by joining the first separator (36) and the second separator (38) together in the state where the first separator and the second separator are stacked together, and the load receiver member (82*a*, 82*b*) protruding from the outer peripheral portion of the joint separator, toward the outside of the joint separator. The load receiver member is fixed to the outer peripheral portion of the joint separator. The load receiver member includes the attachment portion (90) disposed between the outer peripheral portion of the first separator and the outer peripheral portion of the second separator, and the tab (88) continuous with the attachment portion and protruding from the outer peripheral portion of the joint separator. The attachment portion is joined to the outer peripheral portion of the joint separator by the joint portion (102, 104).

In the fuel cell separator member, the joint portion may include the first joint portion (102*a*, 104*a*) configured to join the outer peripheral portion of the first separator and the attachment portion together, and the second joint portion (102*b*, 104*b*) configured to join the outer peripheral portion of the second separator and the attachment portion together.

In the fuel cell separator member, the joint separator may be provided with the reinforcement rib (106) protruding in the separator thickness direction, and the rib is positioned on a side opposite to the tab with respect to the joint portion.

In the fuel cell separator member, the rib may include the first rib (108*a*, 108*b*) protruding from the outer peripheral portion of the first separator toward a side opposite to the second separator, and the second rib (110*a*, 110*b*) protruding from the outer peripheral portion of the second separator toward a side opposite to the first separator.

In the fuel cell separator member, the first expansion (85*a*, 85*b*) expanded toward a side opposite to the second separator may be provided at the portion (84*a*, 84*b*) of the outer peripheral portion of the first separator, the portion supporting the attachment portion, the second expansion (87*a*, 87*b*) expanded toward a side opposite to the first separator may be provided at the portion (86*a*, 86*b*) of the outer peripheral portion of the second separator, the portion supporting the attachment portion, and the outer peripheral end of the first separator and the outer peripheral end of the second separator may contact each other in a portion other than the first expansion and the second expansion.

In the fuel cell separator member, the attachment portion may extend in a direction perpendicular to a direction in which the load receiver member protrudes and to a separator thickness direction, and the joint portion may extend in the longitudinal direction of the attachment portion.

In the fuel cell separator member, the first joint portion and the second joint portion may be coupled together.

The above embodiment discloses the fuel cell stack (10) including the stack body (14) formed by stacking the membrane electrode assemblies (48) and the fuel cell separator members together alternately. Each of the membrane electrode assemblies includes electrodes (54, 56) provided on both sides of the electrolyte membrane (52). The fuel cell separator member is the fuel cell separator member as described above.

The above embodiment discloses the method of producing the fuel cell separator member. The fuel cell separator member includes the joint separator formed by joining the first separator and the second separator together in the state where the first separator and the second separator are stacked together, and the load receiver member protruding from the outer peripheral portion of the joint separator, toward the outside of the joint separator. The load receiver member is fixed to the outer peripheral portion of the joint separator. The load receiver member includes the attachment portion, and the tab continuous with the attachment portion. The method includes the steps of disposing the attachment portion between the outer peripheral portion of the first separator and the outer peripheral portion of the second separator in a manner that the tab protrudes toward the outside of the joint separator, and joining the outer peripheral portion of the joint separator and the attachment portion together after the disposing step.

In the above method of producing the fuel cell separator member, the joining step may include the first joining step of joining the outer peripheral portion of the first separator and the attachment portion together, and the second joining step of joining the outer peripheral portion of the second separator and the attachment portion together.

What is claimed is:

1. A fuel cell separator member comprising:
   a joint separator formed by joining a first separator and a second separator together in a state where the first separator and the second separator are stacked together; and
   a load receiver member protruding from an outer peripheral portion of the joint separator, toward an outside of the joint separator, the load receiver member being fixed to the outer peripheral portion of the joint separator,
   wherein the load receiver member comprises an attachment portion disposed between an outer peripheral portion of the first separator and an outer peripheral portion of the second separator, and a tab continuous with the attachment portion and protruding from the outer peripheral portion of the joint separator, and
   the attachment portion is joined, by a joint portion, to the outer peripheral portion of the first separator and to the outer peripheral portion of the second separator.

2. The fuel cell separator member according to claim 1, wherein the joint portion comprises:
   a first joint portion configured to join the outer peripheral portion of the first separator and the attachment portion together; and
   a second joint portion configured to join the outer peripheral portion of the second separator and the attachment portion together.

3. The fuel cell separator member according to claim 1, wherein
   the joint separator is provided with a reinforcement rib protruding in a separator thickness direction, and
   the reinforcement rib is positioned on a side opposite to the tab with respect to the joint portion.

4. The fuel cell separator member according to claim 3, wherein the reinforcement rib comprises:
   a first rib protruding from the outer peripheral portion of the first separator toward a side opposite to the second separator; and
   a second rib protruding from the outer peripheral portion of the second separator toward a side opposite to the first separator.

5. The fuel cell separator member according to claim 1, wherein
   a first expansion expanded toward a side opposite to the second separator is provided at a portion of the outer peripheral portion of the first separator, the portion supporting the attachment portion,
   a second expansion expanded toward a side opposite to the first separator is provided at a portion of the outer peripheral portion of the second separator, the portion supporting the attachment portion, and an outer peripheral end of the first separator and an outer peripheral end of the second separator contact each other in a portion other than the first expansion and the second expansion.

6. The fuel cell separator member according to claim 1, wherein the attachment portion extends in a direction perpendicular to a direction in which the load receiver member protrudes and to a separator thickness direction, and the joint portion extends in a longitudinal direction of the attachment portion.

7. The fuel cell separator member according to claim 2, wherein the first joint portion and the second joint portion are coupled together.

8. A fuel cell stack comprising a stack body formed by stacking membrane electrode assemblies and fuel cell separator members together alternately, the membrane electrode assemblies each comprising electrodes provided on both sides of an electrolyte membrane, wherein the fuel cell separator members each comprise a joint separator formed by joining a first separator and a second separator together in a state where the first separator and the second separator are stacked together, and a load receiver member protruding from an outer peripheral portion of the joint separator, toward an outside of the joint separator, the load receiver member is fixed to the outer peripheral portion of the joint separator, the load receiver member comprises an attachment portion disposed between an outer peripheral portion of the first separator and an outer peripheral portion of the second separator, and a tab continuous with the attachment portion and protruding from the outer peripheral portion of the joint separator, and the attachment portion is joined, by a joint portion, to the outer peripheral portion of the first separator and to the outer peripheral portion of the second separator.

9. The fuel cell stack according claim 8, wherein the joint portion comprises:

a first joint portion configured to join the outer peripheral portion of the first separator and the attachment portion together; and a second joint portion configured to join the outer peripheral portion of the second separator and the attachment portion together.

10. The fuel cell stack according to claim 8, wherein the joint separator is provided with a reinforcement rib protruding in a separator thickness direction, and the reinforcement rib is positioned on a side opposite to the tab with respect to the joint portion.

11. The fuel cell stack according to claim 10, wherein the reinforcement rib comprises:

a first rib protruding from the outer peripheral portion of the first separator toward a side opposite to the second separator; and a second rib protruding from the outer peripheral portion of the second separator toward a side opposite to the first separator.

12. The fuel cell stack according to claim 8, wherein a first expansion expanded toward a side opposite to the second separator is provided at a portion of the outer peripheral portion of the first separator, the portion supporting the attachment portion, a second expansion expanded toward a side opposite to the first separator is provided at a portion of the outer peripheral portion of the second separator, the portion supporting the attachment portion, and an outer peripheral end of the first separator and an outer peripheral end of the second separator contact each other in a portion other than the first expansion and the second expansion.

13. The fuel cell stack according to claim 8, wherein the attachment portion extends in a direction perpendicular to a direction in which the load receiver member protrudes and to a separator thickness direction, and the joint portion extends in a longitudinal direction of the attachment portion.

14. The fuel cell stack according to claim 9, wherein the first joint portion and the second joint portion are coupled together.

15. A method of producing a fuel cell separator member, the fuel cell separator member comprising:

a joint separator formed by joining a first separator and a second separator together in a state where the first separator and the second separator are stacked together; and a load receiver member protruding from an outer peripheral portion of the joint separator, toward an outside of the joint separator, the load receiver member being fixed to the outer peripheral portion of the joint separator, and including an attachment portion and a tab continuous with the attachment portion, the method comprising the steps of:

disposing the attachment portion between an outer peripheral portion of the first separator and an outer peripheral portion of the second separator in a manner that the tab protrudes toward an outside of the joint separator; and joining the outer peripheral portion of the first separator and the outer peripheral portion of the second separator to the attachment portion with a joint portion after the disposing step.

16. The method of producing the fuel cell separator member according to claim 15, wherein the joining step comprises:

a first joining step of joining the outer peripheral portion of the first separator and the attachment portion together; and a second joining step of joining the outer peripheral portion of the second separator and the attachment portion together.

* * * * *